United States Patent [19]

Stone et al.

[11] 4,161,887
[45] Jul. 24, 1979

[54] MEDIA INDEPENDENT DIFFERENTIAL PRESSURE TRANSDUCER

[75] Inventors: Vaughn L. Stone; Terence K. Rhind; Allen H. Andrews, all of Riverside; John M. Hendrie, Ojai, all of Calif.

[73] Assignee: Bourns, Inc., Riverside, Calif.

[21] Appl. No.: 830,292

[22] Filed: Sep. 2, 1977

[51] Int. Cl.² ............................................. G01L 9/04
[52] U.S. Cl. ....................................... 73/720; 73/706; 338/4; 338/42
[58] Field of Search ............. 73/398 AR, 407 R, 410, 73/706, 720; 338/42, 4; 92/104, 38

[56] References Cited

U.S. PATENT DOCUMENTS 3,400,588  9/1968  O'Connor ......................... 73/407 R
4,058,788  11/1977  Andrews et al. ............... 73/398 AR Primary Examiner—Donald O. Woodiel
Attorney, Agent, or Firm—Paul H. Ware; William G. Becker

[57] ABSTRACT

A differential pressure transducer utilizing fluid-filled chambers as pressure transfer linkage to an isolated, fluid-filled aneroid sensing system. Isolation diaphragms are spread by means of internal fluid pressure fill of transfer chambers, thus providing elevated line pressure mode and pressure-biased operation. Construction offers media isolation from sensitive interior elements of the transducer. Material to come into physical contact with a pressure medium may thus be chosen for specific application. Dual, nested aneroid sensors cooperated to produce a linear displacement in response to an applied pressure differential. A cantilever beam assembly responds to the linear displacement so caused by flexing in a degree proportional to the applied pressure differential. The fluid-filled sensing system may comprise nested, aneroid capsule diaphragms, carrying a sufficient amount of incompressible fluid to support the capsule diaphragm for high line pressure use. The nested, aneroid capsule diaphragms are thus also spread by the fluid pressure, thereby placing the pressure deflection of the aneroids in an elevated line pressure mode and providing pressure-biased operation. Strain gages respond to the flexing of the cantilever beam assembly, thereby having an electrical signal induced in them proportional to the applied differential pressure as sensed by the aneroid capsule diaphragm sensors.

7 Claims, 5 Drawing Figures

SECTION A-A

MEDIA INDEPENDENT DIFFERENTIAL PRESSURE TRANSDUCER

BACKGROUND OF THE INVENTION

1. Field of the Invention

This invention relates generally to differential pressure transducers and more particularly to differential pressure transducers employing aneroid capsule diaphragms as pressure sensing elements.

2. Description of the Prior Art

Differential pressure transducers are known in which a rigidly connected pair of aneroid capsule diaphragms are constrained to flex cooperatively upon the application of differential pressures to its inlet ports. The resultant displacement is toward the lower pressure and the magnitude of the displacement is proportional to the differential between the applied pressures.

In one application, for example, the pressure incident upon a reference compartment of a differential pressure capsule may be reduced below that unknown pressure to be incident upon the other compartment. Applying this unknown pressure to this other compartment, the reference pressure may be built up in a series of small pressure increments. When the two pressures are made equal, within the limits of the sensitivity of the differential pressure capsule and within the resolution of the small pressure increments, that event can be observed by the closing of a contact located on a diaphragm situate between the two pressures.

Other approaches may be examined by reference to the prior art. A patent application, Ser. No. 673,493, filed 4/5/76 and assigned to the same assignee as the present patent application, describes motion sensing means similar to that utilized in the present invention. One such system is described in U.S. Pat. No. 3,901,082 to Lyon for *Fluid Pressure Sensing System and Differential Pressure Unit Therefore*. Another such system is defined in U.S. Pat. No. 3,882,443 to Martia for *Differential Pressure Transducer*.

Many prior art devices have been developed as particular solutions to specific problems and thus have served narrow purposes. Applicant does not know of a prior art system that provides isolation for the mechanism of the pressure transducer by means of fluid linkage along with the other advantages of the present invention. While presently available differential pressure transducers can measure differential fluid pressures, some of the disadvantages of these prior art transducers include the incidence of the media upon the sensing elements of the transducer. Such physical contact may be undesirable for a variety of reasons, among which may commonly be listed corrosive media, for example.

It would thus be a great advantage to the art to provide a differential pressure transducer in which the fluid media under the pressure to be determined need not come into direct contact with the sensing elements thereof.

Another great advantage would be the provision of a differential pressure transducer that has inherent protection against high line pressure overloads.

A further desirable advantage would be to provide such a transducer with an easy electrical readout capability.

SUMMARY OF THE INVENTION

It is an object of the present invention to provide a differential pressure transducer in which the fluid media under the pressure to be determined need not come into direct contact with the sensing elements.

Another object of the present invention is to provide a differential pressure transducer having inherent protection against high line pressure overloads.

Yet another object of the present invention is the provision of a differential pressure transducer exhibiting the above advantages and having also an easy electrical readout capability.

In the accomplishment of these and other objects, a differential pressure transducer is provided that effectively isolates the sensing elements from the media under the pressure to be measured. The basic design incorporates three independent fluid chambers, two isolator fluid chambers, and one central chamber in fluid communication with a pair of nested, convoluted aneroid sensing capsule diaphragms. Even though all fluids are compressible to some extent, some such as water, oil, etc. exhibit very low compressibility and are thus referred to as being incompressible. The term "incompressible" as used herein shall be understood to refer to one of these fluids. The central chamber is filled with a suitable amount of incompressible fluid to support the aneroid capsule diaphragms for high line pressure utilization and to spread the aneroid capsule diaphragms, thus placing the pressure deflection of the aneroids in an elevated line pressure mode thus providing pressure biased operation. The two isolator fluid chambers are basically used as a pressure transfer linkage from the applied pressure media to the aneroid pressure sensing capsule diaphragms. Isolators and sensing diaphragms are all structured to operate in a mechanical and pressure biased mode. Isolator diaphragms, in fluid communication with their respective isolator fluid chambers, are fabricated and supported so as to limit the amount of fluid transfer to the aneroid sensors.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
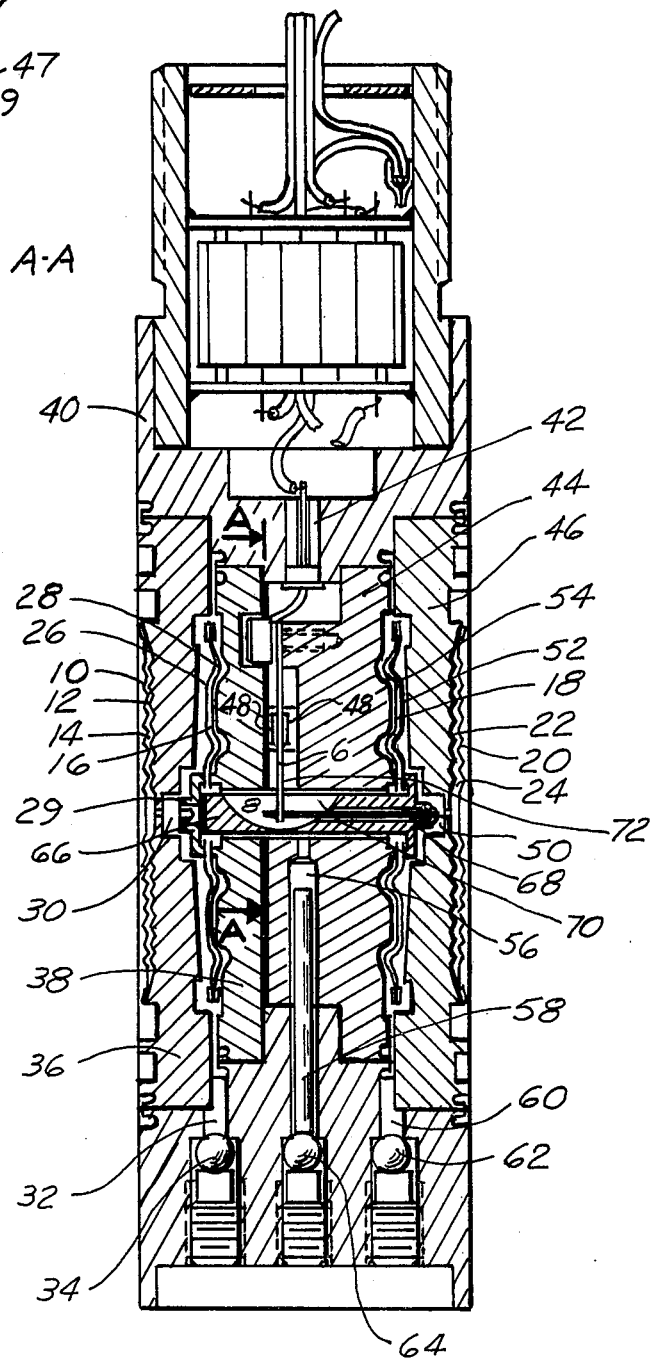
FIG. 1 is a schematic diagram of a cross-sectional view of a differential pressure transducer as contemplated by the invention.

Referring to FIG. 1 with greater particularity, a schematic diagram of a differential pressure transducer within a pressure capsule as contemplated by the invention is shown. A first isolator chamber 30 has an associated diaphragm assembly 14 comprising outer diaphragm 10 and support ring 12. A filler tube 32 for the purpose of filling isolator chamber 30 is in fluid communication therewith and is sealed after filling by means of ball seal 34. Isolator ring assembly 36 provides mechanical support for diaphragm 10. An isolating boundary for isolator chamber 30 is provided by support ring assembly 38.

Situate within isolator chamber 30 is aneroid sensing element 16 comprising aneroid outer diaphragm 26 and aneroid inner diaphragm 28. Aneroid sensing element 16 is attached to the spacer tube 66 by means of bracket 29 and support ring 38.

A second isolator chamber 50 has an associated diaphragm assembly 24 comprising diaphragm 20 and support ring 22. Isolator chamber 50 is also attached to spacer tube 66 but at the other end thereof and to support 44 by means of welding or brazing or the like. A filler tube 60 for the purpose of filling isolator chamber 50 is in fluid communication therewith and is sealed after filling by means of ball seal 62. Isolator ring assembly 46 provides mechanical support for diaphragm 24. An isolating boundary for isolator chamber 50 is provided by support ring assembly 44.

Situate within isolator chamber 50 is aneroid sensing element 18 comprising aneroid outer diaphragm 52 and aneroid inner diaphragm 54. Aneroid sensing element 18 is attached to the spacer tube 66 and support ring assembly 44 by means of welding or brazing or the like.

An interior fluid chamber 70 is in fluid communication with both aneroid sensing elements 16 and 18. A filler tube 56 for the purpose of filling interior fluid chamber 70 is in fluid communication therewith and is sealed after filling by means of ball seal 64. Filler tube 56 contains a rod 58 for taking up volume that would otherwise be occupied by the fluid used to fill the interior fluid system.

A cantilever beam assembly 72 comprising a deflectable cantilever beam 6 and a strut wire 68 projects into interior fluid chamber 70 through a cutout 8 in spacer tube 66. Displacement sensing means 48 comprising strain gages 49 and terminal pads 47 are attached to the deflectable cantilever beam 6. The strut wire 68 may be attached to the cantilever beam 6 by means such as welding, brazing or the like. Electrical signal output induced in strain gages 49 and supplied through terminal pads 47 may be taken out of the body 40 of the transducer by means of high pressure terminals 42.

Interior fluid chamber 70 forms a closed compartment and in operation is filled with an incompressible fluid as are the isolator fluid chambers 30 and 50. Assume, for example, that a higher pressure $P_1$ is applied to diaphragm assembly 14 than $P_2$, applied to diaphragm assembly 24. In this circumstance, outer diaphragm 10 will contract toward inner diaphragm 12 and increase the pressure of the fluid in isolator fluid chamber 30. As a result of the foregoing, the aneroid outer and inner diaphragms 26 and 28 respectively of first aneroid sensing element 16 will contract toward each other. Under the influence of $P_2$, the contraction of diaphragm 24 through the movement of outer diaphragm 21 toward inner diaphragm 22 will be less because $P_2$ has been hypothesized as less than $P_1$. The increase in pressure in isolator fluid chamber 50 will then be less than that in isolator fluid chamber 30. As a net result, the aneroid outer and inner diaphragms 52 and 54 respectively of second aneroid sensing element 18 will expand away from each other thus allowing spacer tube 66 to move toward the right a distance proportional to the magnitude of the differential pressure as applied by $P_1$ and $P_2$.

Figure 2:
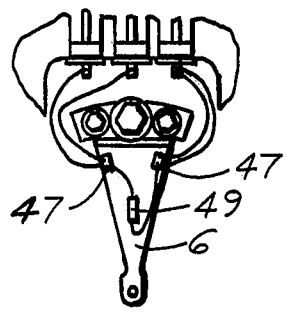
FIG. 2 is a detail drawing of the cantilever beam.

Referring now to FIG. 2, the detail drawing of the cantilever beam illustrates the mounting of strain gage 49 on one side of the beam. Another like strain gage is attached to the other side of the beam along with the associated terminal pads 47. Means for securing the mechanical integrity of the stationary end of the deflectable cantilever beam are also shown but are not an essential part of the present invention.

Figure 4:
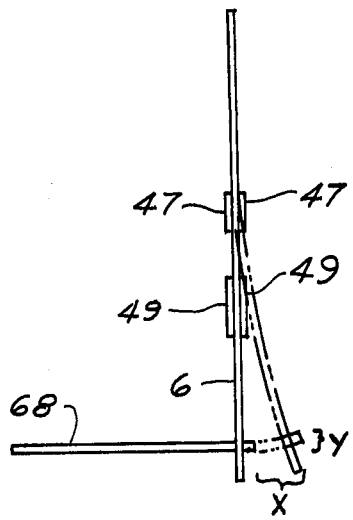
FIG. 4 is a detail drawing showing the result of flexure of the cantilever beam.
Figure 3:
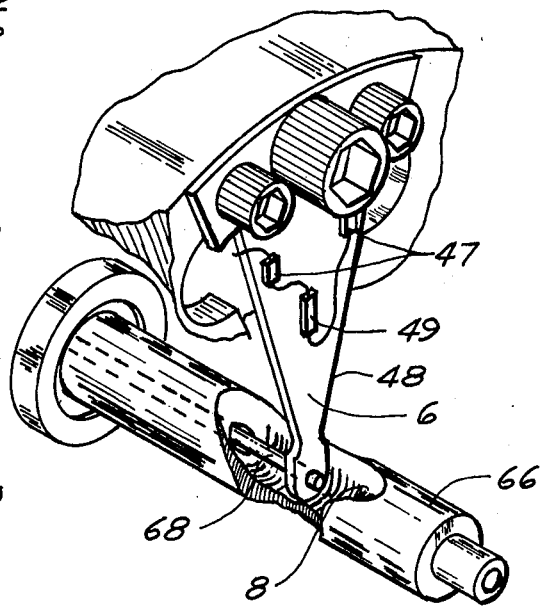
FIG. 3 is an idealized perspective drawing showing the relationships between the cantilever beam assembly, the spacer tube and the strain gages.

Given now the fact of the direction and magnitude of the displacement of spacer tube 66, reference to FIGS. 3 and 4 facilitate an explanation of the results of such displacement. In FIG. 3 it is evident that movement of the spacer tube 66 in the direction of the arrow will cause the deflectable cantilever beam 6 to flex in the same direction by reason of its being driven by strut wire 68. The upper part of deflectable cantilever beam 6 is held immovably and firmly to the body of the transducer by means of some fastening device as shown in FIG. 2. A network 48 comprising a strain gage 49 and terminal pads 47 is attached to each side of the beam 6. This network is connected by means of high pressure terminals 42 (FIG. 1) to external conductors. Strain gage networks and associated circuitry are well known in the art wherein deflection of a beam such as 6 alters the resistivity of strain gages 49 such that the amount of beam deflection can be measured. Since the amount of beam deflection is proportional to the differential pressure as applied by $P_1$ and $P_2$, the differential pressure is thus a derived parameter of the system.

Reference to FIG. 4 allows a different perspective relative to movement of the deflectable cantilever beam 6. In common with patent application Ser. No. 673,493 supra, strut wire 68 is substantially rigid in a longitudinal direction parallel to the axis of spacer tube 66, but is resiliently flexible in the transverse direction. Thus when deflectable cantilever beam 6 is deflected by a longitudinal movement of the diaphragms, strut wire 68 flexes in a transverse direction as well as moving longitudinally with the diaphragms, thereby enabling beam 6 to bend in a natural arcuate path. In FIG. 4, beam 6 and strut wire 68 are shown in an unstressed position in solid lines, and in dashed lines in a position following deflection of the beam. It is seen that, in addition to a longitudinal movement x, the arcuate path followed by the beam also results in a transverse movement y. In addition, the imposed stress is not uniform at different locations; the beam can be under tension at one end and under compression at the other end, with a null in the middle. This makes the placement of the strain gages 49 critical. In the present invention, however, the beam stress is much more uniform for a given amount of deflection, and the location of the strain gages 49 on the beam is correspondingly less critical.

Figure 5:
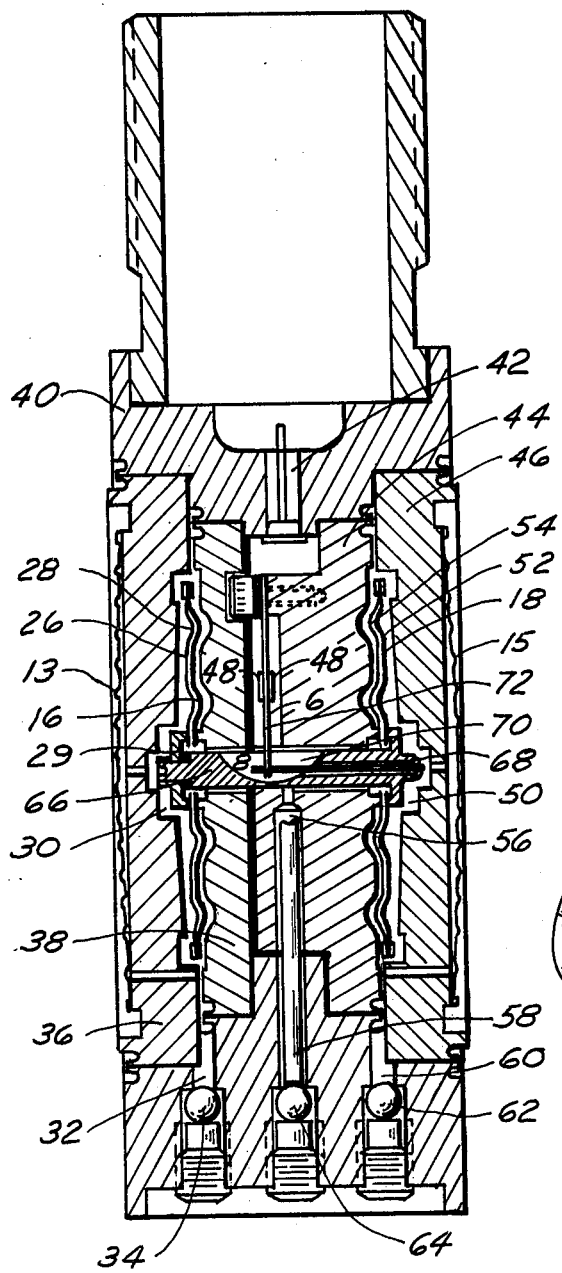
FIG. 5 is a schematic diagram of another embodiment of the invention.

In FIG. 5, an alternative embodiment of the invention is shown. The important distinction is in the replacement of the diaphragm assemblies 14 and 24 of FIG. 1 with the diaphragms 13 and 15 of FIG. 5. If now a higher pressure $P_1$ is applied to diaphragm 13 than a pressure $P_2$ applied to diaphragm 15, diaphragm 13 will move toward isolator ring assembly 36 thus raising the pressure of the fluid in isolator fluid chamber 30. Aneroid outer and inner diaphragms 26 and 28 respectively of first aneroid sensing element 16 will contract toward each other as a result. Under the influence of $P_2$, the contraction of diaphragm 15 will be less because in our example we have constrained $P_2$ to be less than $P_1$. The increase in pressure in isolator fluid chamber 50 will then be less than that in isolator fluid chamber 30. As a net result, as before, the aneroid outer and inner diaphragms 52 and 54 respectively of second aneroid sensing element 18 will expand away from each other thus allowing spacer tube 66 to move toward the right a distance proportional to the magnitude of the differential pressure as applied by $P_1$ and $P_2$.

Thus there has been described an aneroid differential pressure transducer that will isolate the pressure sensing elements thereof from a pressure bearing medium. Inherent over-pressure protection has been built into the invention through the device of providing mechanical support for nesting diaphragm assemblies 16 and 18. Upon the nesting of these diaphragm assemblies, there can be no further fluid transfer to the isolator chambers and hence no increased motion to spacer tube 66. The capability of the sensor to withstand high over-pressure provides redundant protection as described in one embodiment. Flexing of the cantilever beam through its being driven by a strut wire, which has the facility of flexing in a transverse dimension, enables the beam to be driven in a natural arcuate path thus relieving the criticality of the placement of strain gate sensors on the beam. Therefore, great improvements in flexibility, accuracy, and safety have been provided through the novel advantages of the invention.

It is pointed out that although the present invention has been shown and described with reference to particular embodiment, nevertheless various changes and modifications obvious to one skilled in the art to which the invention pertains are deemed to lie within the purview of the invention.

What is claimed and desired to be secured by Letters Patent of the United States is:

1. A differential pressure transducer comprising
 a pressure capsule;
 a first isolator chamber means in said pressure capsule for linking external pressures to said capsule having
 pressure biasing means for maintaining elevated pressure in said first isolator chamber means, and
 first diaphragm means coupling said external pressures to said first isolator chamber means;
 a second isolator chamber means in said pressure capsule for linking external pressures to said capsule having
 pressure biasing means for maintaining elevated pressure in second isolator chamber means, and
 second diaphragm means coupling said external pressures to said second isolator chamber means;
 support means for providing mechanical support for said diaphragm means under conditions of overpressure;
 a first aneroid sensing means nested in said first isolator chamber means connected to a moveable spacer tube means transforming external pressures on said capsule coupled by diaphragm means into linear displacements of said aneroid sensing element as a function of the magnitude of the external pressures;
 a second aneroid sensing means nested in said first isolator chamber means connected to said moveable spacer tube means transforming external pressures on said capsule coupled by diaphragm means into linear displacements of said aneroid sensing element as a function of the magnitude of the external pressures;
 pressure biasing means for maintaining elevated pressures in said aneroid sensing elements;
 displacements sensing means connected to said spacer tube means for sensing said linear displacements; and
 support ring means contoured to the said aneroid sensing elements and forming said isolator chamber means.

2. The differential pressure transducer of claim 1, wherein said isolator chamber means is filled with an incompressible fluid.

3. The differential pressure transducer of claim 2 wherein said first and second diaphragm means are sealed assemblies of support ring and diaphragm in fluid communication with said first and second isolator chambers.

4. The differential pressure transducer of claim 3, wherein said support means is contoured to conform to the shape of said diaphragm means.

5. The differential pressure transducer of claim 1, wherein said aneroid sensing elements are filled with an incompressible fluid.

6. The differential pressure transducer of claim 1, wherein said displacement sensing means comprises:
 cantilever beam means;
 strut wire means connecting said cantilever beam means to said spacer tube means; and
 strain gage means attached to said cantilever beam means.

7. The differential pressure transducer of claim 6 wherein said strut wire means is elastically flexible in its transverse dimension.

* * * * *